(12) United States Patent
Kimura et al.

(10) Patent No.: US 7,056,104 B2
(45) Date of Patent: Jun. 6, 2006

(54) COMPRESSOR UNIT WITH AN ELECTRICAL CIRCUIT DEVICE CONNECTED TO THE MAIN BODY AND AN ELECTRICAL POWER CONNECTOR

(75) Inventors: Kazuya Kimura, Kariya (JP); Kazuhiro Kuroki, Kariya (JP); Hiroyuki Gennami, Kariya (JP); Ken Suitou, Kariya (JP)

(73) Assignee: Kabushiki Kaisha Toyota Jidoshokki, Aichi-ken (JP)

( * ) Notice: Subject to any disclaimer, the term of this patent is extended or adjusted under 35 U.S.C. 154(b) by 151 days.

(21) Appl. No.: 10/364,754

(22) Filed: Feb. 11, 2003

(65) Prior Publication Data

US 2003/0156954 A1 Aug. 21, 2003

(30) Foreign Application Priority Data

Feb. 15, 2002 (JP) .............................. 2002-038433

(51) Int. Cl.
*F04B 17/03* (2006.01)

(52) U.S. Cl. .............................. 417/410.1; 417/410.3; 417/410.5; 310/71; 310/88; 310/85; 439/610; 439/275; 439/279

(58) Field of Classification Search ............. 417/410.1, 417/410.3, 410.5; 310/71, 88, 85; 439/610, 439/274, 275, 279, 655, 600, 559, 469, 598
See application file for complete search history.

(56) References Cited

U.S. PATENT DOCUMENTS

| | | | | |
|---|---|---|---|---|
| 5,199,898 A | * | 4/1993 | Wisner | 439/367 |
| 5,281,762 A | * | 1/1994 | Long et al. | 174/78 |
| 5,645,450 A | * | 7/1997 | Yamada et al. | 439/585 |
| 5,885,062 A | * | 3/1999 | Inoue et al. | 417/280 |
| 5,911,599 A | * | 6/1999 | Masuda | 439/610 |
| 5,997,349 A | * | 12/1999 | Yoshioka | 439/579 |
| 6,142,741 A | | 11/2000 | Nishihata et al. | |
| 6,315,527 B1 | * | 11/2001 | Makino et al. | 417/410.1 |
| 6,315,528 B1 | * | 11/2001 | Williams et al. | 417/410.5 |
| 6,354,878 B1 | * | 3/2002 | Kropa et al. | 439/610 |
| 6,619,933 B1 | * | 9/2003 | Ikeda | 417/410.1 |
| 6,699,078 B1 | * | 3/2004 | Quadir | 439/693 |

FOREIGN PATENT DOCUMENTS

| | | |
|---|---|---|
| JP | 10-159777 | 6/1998 |
| JP | 11-182909 | 7/1999 |
| JP | 2000-002182 | 1/2000 |

* cited by examiner

*Primary Examiner*—Timothy S. Thorpe
*Assistant Examiner*—Emmanuel Sayoc
(74) *Attorney, Agent, or Firm*—Knoble Yoshida & Dunleavy LLC

(57) ABSTRACT

A compressor unit has a compressor main body, an electrical circuit device and a connector. The electrical circuit device is electrically connected to the compressor main body through a cable. The cable has a proximal end and a distal end. One of the compressor main body and the electrical circuit device is integrally connected to the cable at the proximal end of the cable, and the other has a terminal thereon. The connector is provided at the distal end of the cable and is detachably connected to the terminal.

29 Claims, 5 Drawing Sheets

COMPRESSOR UNIT WITH AN ELECTRICAL CIRCUIT DEVICE CONNECTED TO THE MAIN BODY AND AN ELECTRICAL POWER CONNECTOR

BACKGROUND OF THE INVENTION

The present invention relates to a compressor unit that includes a compressor main body and an electrical circuit device.

A compressor main body of such a compressor unit is disclosed in Unexamined Japanese Patent Publication No. 10-159777. The compressor main body includes a sealed casing or a housing, an electric motor and a sealed terminal or a terminal. The electric motor is fixedly accommodated in the sealed casing. The sealed terminal is fixedly connected to the sealed casing for electrically connecting an external power source to the electric motor.

Now referring to FIG. 5, in the compressor unit, for example, a terminal substantially identical to the above mentioned terminal is fixedly connected to a housing 91 of a compressor main body 90. A portion 92 for drawing wiring is connected to the terminal. The portion 92 is fastened to the housing 91 by a bolt and includes a plurality of cables 93A that is conducted with the terminal at its first proximal end. The cables 93A are tied together by a tying tube 94. A first relay connector 95A is provided at a first distal end of the cables 93A, and the first distal end is the opposite end of the first proximal end. Additionally, a cable fixing member 96 is fixedly connected to the housing 91 and holds a middle portion of the cables 93A between the first proximal end and the first distal end. Meanwhile, a cable 93B is provided with an electrical circuit device 97 at its second proximal end for supplying electric current to the terminal. A second relay connector 95B is provided at a second distal end of the cable 93B for connecting with the first relay connector 95A. When the first relay connector 95A is connected to the second relay connector 95B, the compressor main body 90 is electrically connected to the electrical circuit device 97.

An unwanted feature is that a cable for electrically connecting the compressor main body 90 to the electrical circuit device 97 is constituted of the cable 93A and the cable 93B. The cables 93A, 93B respectively provide the first and second relay connectors 95A, 95B for electrically connecting the cable 93A with the cable 93B. For example, in comparison to a structure that an electrical circuit is device is directly connected to a portion for drawing wiring on a compressor main body through a cable that does not include a connecting portion by relay connectors, the structure with the relay connectors 95A, 95B requires extra costs for components and assembling. In a process of manufacturing a compressor unit, since components such as a cable in indeterminate forms are inappropriate for automatically assembling, for example, by a robot, the process is mostly done by human hands. As a result, the costs for assembling the relay connectors 95A, 95B are relatively high and tend to increase manufacturing costs of the compressor unit. Therefore, there is a need for reducing costs for components and assembling in a compressor unit.

SUMMARY OF THE INVENTION

In order to solve the above and other problems, according to a first aspect of the current invention, a compressor unit including a compressor main body, an electrical circuit device electrically connected to the compressor main body through a cable, the compressor main body or the electrical circuit device integrally being connected to the cable at one end of the cable, and a connector provided at the other end of the cable for being connected to a terminal and including a cable fixing member for fixing the cable to a casing of the connector, the cable fixing member including first and second fixing members that respectively have first and second restricting surfaces, the first and second fixing members being alternately positioned on two sides along a longitudinal direction of the cable while the first and second fixing members are press-fitted into the casing in such a manner that the first and second restricting surfaces are pressed against an inner surface of the casing, the first and second fixing members having first and second inserting openings in an opposing direction for inserting the cable, the cable being engaged by inner circumferential surfaces of the first and second inserting openings due to pressing force generated at the first and second restricting surfaces in such a manner that the inner circumferential surfaces of the first and second inserting openings presses the cable in the opposing direction.

According to the second aspect of the current invention, a connector for a cable connecting a compressor and a electrical circuit, the cable having a lead wire, an electromagnetic shielding portion and an insulating layer, the connector including a casing; a conductor located in the casing for contacting the electromagnetic shielding portion of the cable, the conductor including first and second conductors that respectively have first and second contacting openings, the first and second conductors being alternately positioned on two sides along a longitudinal direction of the cable for sandwiching the electromagnetic shielding portion of the cale by the first and second contact openings, and a cable fixing member located in the casing for fixedly placing the cable at a predetermined position within the casing, the cable fixing member including first and second fixing members that respectively have first and second inserting openings, the first and second fixing members being alternately positioned on two sides along a longitudinal direction of the cable for sandwiching the insulating layer of the cable by the first and second inserting openings.

According to the third aspect of the current invention, a connector for a cable connecing a compressor and an electrical circuit, the cable having a lead wire, an electromagnetic shielding portion and an insulating layer, the connector including a casing; a conductor located in the casing for contacting the electromagnetic shielding portion of the cable; and a cable fixing member located near the conductor in the casing for fixedly placing the cable at a predetermined position within the casing, the cable fixing member including first and second fixing members that respectively have first and second inserting openings, the first and second fixing members being alternately positioned on two sides along a longitudinal direction of the cable for sandwiching the insulating layer of the cable by the first and second inserting openings.

BRIEF DESCRIPTION OF THE DRAWINGS

The features of the present invention that are believed to be novel are set forth with particularity in the appended claims. The invention together with objects and advantages thereof, may best be understood by reference to the following description of the presently preferred embodiments together with the accompanying drawings in which:

DETAILED DESCRIPTION OF THE PREFERRED EMBODIMENTS

A preferred embodiment of the present invention will now be described in reference to FIGS. 1 through 3G. The front side and the rear side of an electric type compressor or a motor compressor C respectively correspond to the right side and the left side in FIG. 1.

Figure 1:
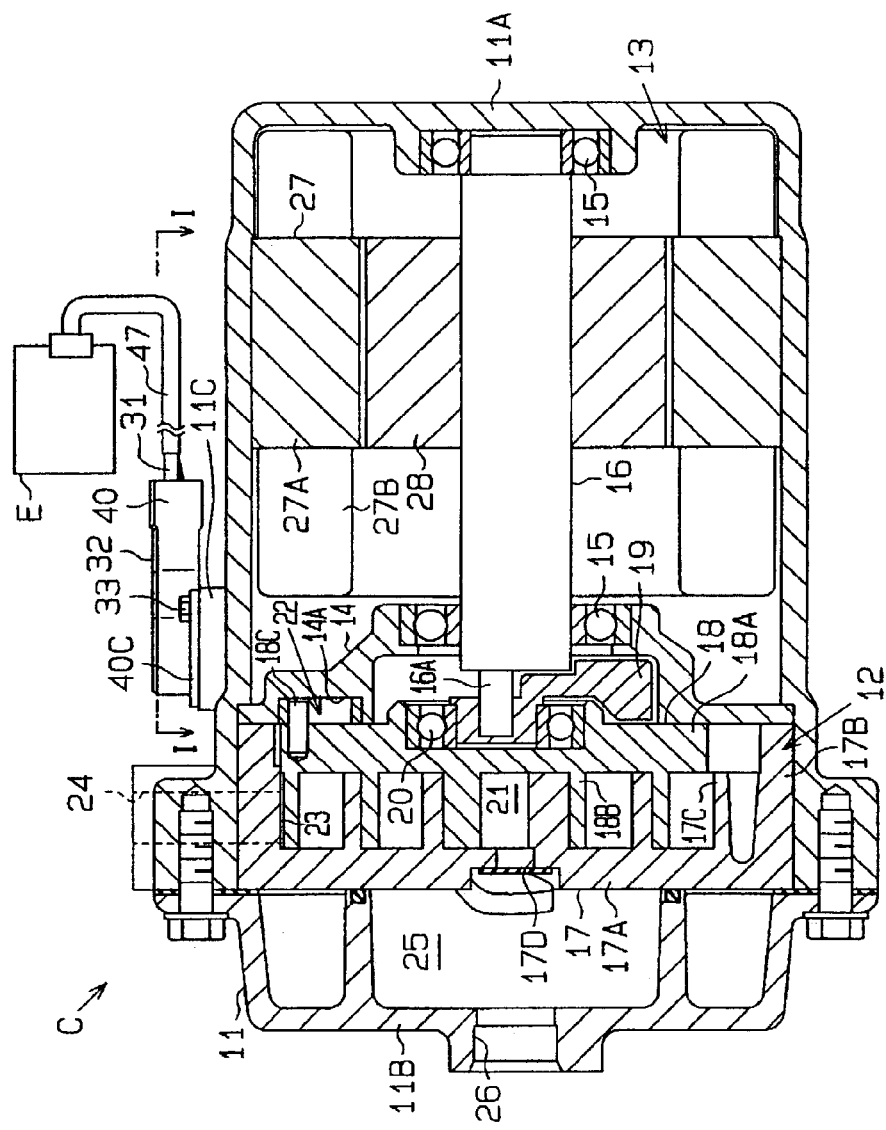
FIG. 1 is a schematic partially cross-sectional side view of a compressor unit according to a preferred embodiment of the present invention.

Now referring to FIG. 1, a diagram illustrates a schematic partially cross-sectional side view of a compressor unit according to the preferred embodiment of the present invention. The compressor unit includes the motor compressor or a compressor main body C and an inverter circuit or an electrical circuit device E. A housing 11 of the motor compressor C accommodates a compression mechanism 12 and an electric motor 13 for driving the compression mechanism 12. The housing 11 is manufactured by die-casting aluminum alloy. The housing 11 includes a front end wall 11A and a support wall 14 that is substantially located in the middle of the motor compressor C. The housing 11 rotatably supports a rotary shaft 16 through bearings 15 that are respectively located on the support wall 14 and the front end wall 11A.

The compression mechanism 12 is a scroll type and includes a fixed scroll member 17 and a movable scroll member 18. The fixed scroll member 17 includes a disc-shaped fixed scroll base plate 17A, a cylindrical outer wall 17B and a fixed scroll wall 17C. The outer wall 17B extends from the outer periphery of the fixed scroll base plate 17A. The fixed scroll wall 17C extends from the fixed scroll base plate 17A and is located in the outer wall 17B.

A crankshaft 16A is provided at the rear end of the rotary shaft 16. The movable scroll member 18 is supported by the crankshaft 16A through a bushing 19 and a bearing 20 in such a manner that the movable scroll member 18 faces the fixed scroll member 17, and the movable scroll member 18 rotates relative to the fixed scroll member 17. The movable scroll member 18 includes a disc-shaped movable scroll base plate 18A and a movable scroll wall 18B that extends rearward from the movable scroll base plate 18A.

In the fixed scroll member 17 and the movable scroll member 18, the scroll walls 17C, 18B engage with each other, and each distal end surface of the scroll walls 17C and 18B contacts the respective base plates 18A and 17A. Accordingly, the fixed scroll base plate 17A, the fixed scroll wall 17C, the movable scroll base plate 18A and the movable scroll wall 18B define compression chambers 21.

A known self-rotation blocking mechanism 22 includes a cylindrical recess 14A and a pin 18C. The cylindrical recess 14A is formed in the rear end of the support wall 14. The pin 18C extends from the front end surface of the movable scroll base plate 18A and is loosely fitted in the cylindrical recess 14A.

A suction chamber 23 is defined between the outer wall 17B and an outer peripheral portion of the movable scroll wall 18B. The suction chamber 23 communicates with an external conduit through a suction passage 24, which is formed in the outer circumferential wall of the housing 11. The external conduit is connected to an evaporator of an external refrigerant circuit. The external conduit and the evaporator are not shown in the drawing.

A discharge chamber 25 is defined in the housing 11 and is located rearward from the fixed scroll member 17. Refrigerant is discharged from the compression chamber 21 to the discharge chamber 25. The discharge chamber 25 communicates with the external conduit through a discharge passage 26, which is formed in a rear end wall 11B of the housing 11. The external conduit is connected to a condenser of the external refrigerant circuit. The condenser is not shown in the drawing.

The electric motor 13, which is a brushless DC motor, includes a stator 27 and a rotor 28. The stator 27 is located in front of the support wall 14. The stator 27 includes a cylindrical iron core 27A and a coil 27B that is wound around the iron core 27A. Meanwhile, the rotor 28 made of magnet is located inside the stator 27 and is fixedly connected to the rotary shaft 16.

As the rotary shaft 16 is driven by the electric motor 13, the movable scroll member 18 orbits through the crankshaft 16A around a central axis of the fixed scroll member 17 in the compression mechanism 12. Meanwhile, the self-rotation blocking mechanism 22 blocks self-rotation of the movable scroll member 18 and only allows the movable scroll member 18 to orbit. As the movable scroll member 18 orbits, the compression chambers 21 radially and inwardly move from the outer peripheral side of the scroll walls 17C, 18B toward the center of the scroll walls 17C, 18B while the volumes of the compression chambers 21 progressively reduce. As a result, the refrigerant introduced from the suction chamber 23 into the compression chambers 21 is compressed. The compressed refrigerant is discharged to the discharge chamber 25 through a discharge port 17D, which is formed in the fixed scroll base plate 17A, and is sent to the external refrigerant circuit through the discharge passage 26.

The inverter circuit E supplies electric current to the electric motor 13 of the motor compressor C. A cable 31 is integrally connected to the inverter circuit E at its proximal end by a fitting that is fastened by a screw. The fitting and the screw are not shown in the drawing. A connector 32 is provided at a distal end of the cable 31. Namely, the inverter circuit E, the cable 31 and the connector 32 are integrated with each other. Meanwhile, a boss 11C extends from the outer circumferential wall of the housing 11. The connector 32 is detachably connected to the boss 11C and is fastened by a bolt 33. Incidentally, the cables 31 between the connector 32 and the inverter circuit E are tied together by a tying tube 47.

Figure 2A:
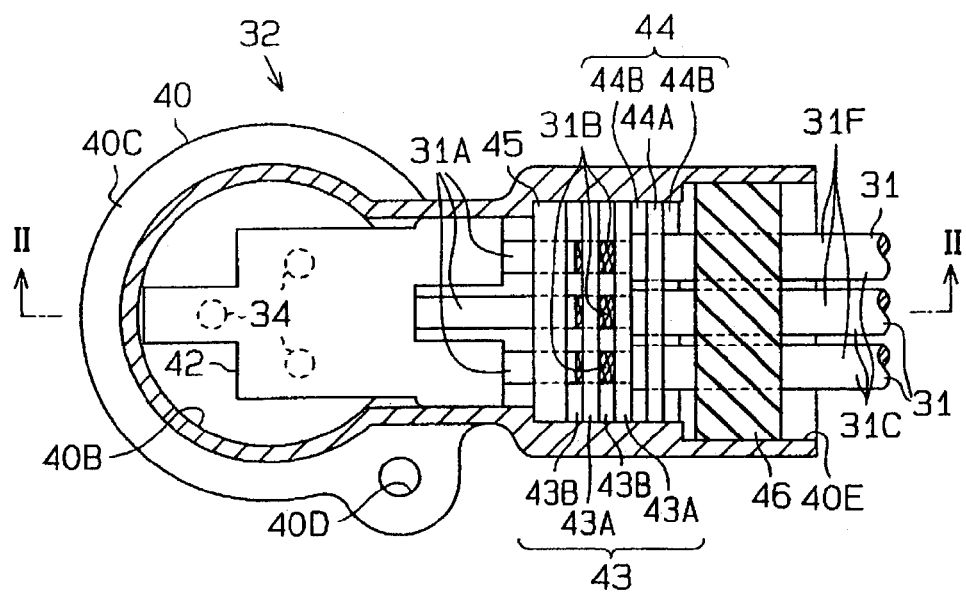
FIG. 2A is a cross-sectional plan view that is taken along the line I—I in FIG. 1.

Now referring to FIG. 2A, a diagram illustrates a cross-sectional plan view that is taken along the line I—I in FIG. 1. The connector 32 includes a connector casing 40 made of electrically conductive metal. A flange 40C is integrally formed with the connector casing 40 and has a through hole 40D for inserting the bolt 33 of the FIG. 1. The bolt 33 is not shown in FIG. 2A. Three terminals 34 are provided on the housing side for receiving electric current from the connector 32. The same numbers of the distal ends of the cables 31 as the terminals 34 are inserted through an insertion opening 40E of the connector casing 40 into the connector casing 40 for connecting with the terminals 34.

Figure 2B:
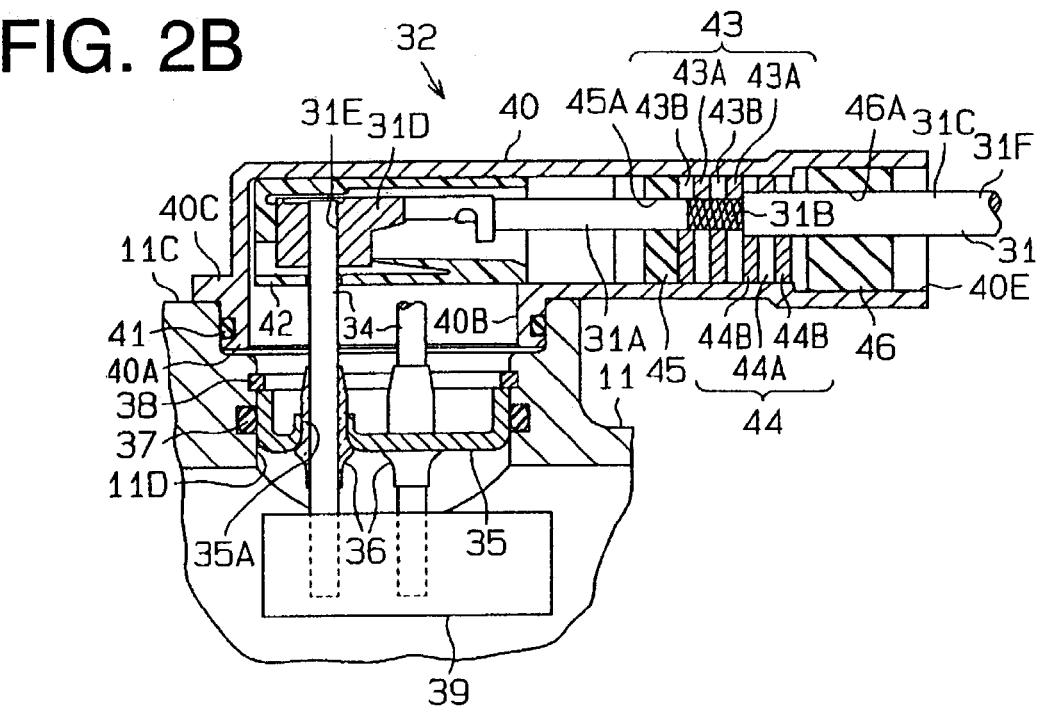
FIG. 2B is a partially cross-sectional side view that is taken along the line II—II in FIG. 2A.

Now referring to FIG. 2B, a diagram illustrates a partially cross-sectional side view that is taken along the line II—II in FIG. 2A. A communication bore 11D is formed at the boss 11C to interconnect the inside and outside of the housing 11. A metallic support member 35 is fitted in the communication bore 11D, and the terminals 34 are fixedly connected to the support member 35. Strictly, through holes 35A are formed in the support member 35, and the terminals 34 are inserted into the respective through holes 35 and are welded to the support member 35 with glass welding portions 36.

An O-ring 37 is located between the inner circumferential surface of the communication bore 11D and the outer circumferential surface of the support member 35 to seal a gap therebetween. Additionally, a retaining ring 38 is provided in the communication bore 11D for preventing the support member 35 is from slipping out of the housing 11. The ends of the terminals 34 inside the housing 11 are accommodated in a shared resin casing 39 and are electrically connected to the coil 27B of the electric motor 13. The resin casing 39 is not shown in the FIG. 2B.

A substantially cylindrical fitting portion 40A is integrally formed with the connecter casing 40. While the connector 32 is fitted to the boss 11C of the electric motor C, the fitting portion 40A is inserted into the communication bore 11D. In this state, the terminals 34 are being inserted in the connector casing 40 through an inner space 40B of the fitting portion 40A. Meanwhile, the flange 40C is fastened to the housing 11 by the bolt 33 of FIG. 1 so that the flange 40C tightly adheres to a metallic portion of the housing 11. Additionally, an O-ring or a waterproof seal member 41 is located between the inner circumferential surface of the communication bore 11D and the outer circumferential surface of the fitting portion 40A to seal a gap therebetween.

Each of the cables 31 is a shield cable that includes an insulating layer 31A and a reticular electromagnetic shielding portion 31B. The insulating layer 31A is wound around a lead wire, and the electromagnetic shielding portion 31B is wound around the insulating layer 31A so as to be isolated from the lead wire. The electromagnetic shielding portion 31B is also covered with an insulating layer 31C.

Fasteners or terminal connecting portions 31D are fixedly connected to the distal ends of the cables 31. Each of the fasteners 31D is conducted with the respective lead wire and includes a through hole 31E for connecting with the terminal 34. In a state when the connector 32 is fitted to the boss 11C, each of the terminals 34 is also fitted into the respective through hole 31E and is electrically connected to the respective fastener 31D. The fasteners 31D are fixedly accommodated in a shared resin casing 42 so that each of the fasteners 31D is positioned so as to correspond with the respective terminal 34 in a state when the connector 32 is fitted to the boss 11C.

The electromagnetic shielding portion 31B of the cable 31 is exposed in a predetermined length in a longitudinal direction of the cable 31 in the connector casing 40. The exposed portion of the electromagnetic shielding portion 31B is conducted with a metal portion of the connector casing 40 through a shield conductor 43. The shield conductor 43 includes first conductors 43A and second conductors 43B, which are alternately layered. Two of each first conductor 43A and second conductor 43B are alternately layered in the preferred embodiment. The first and second conductors 43A, 43B each are made of electrically conductive metal plate.

Figure 3A:
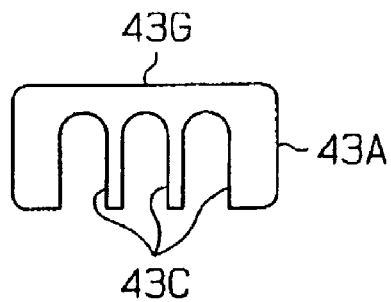
FIG. 3A is a schematic end view of a first conductor according to the preferred embodiment of the present invention.

Now referring to FIG. 3A, a diagram illustrates a schematic end view of is the first conductor 43A according to the preferred embodiment of the present invention. The first conductor 43A is substantially rectangular in shape and includes three substantially oblong recesses or first inserting openings 43C that extend in thickness through the first conductor 43A. The bottom end of the oblong recess 43C is substantially circular arc in shape. The exposed portion of the electromagnetic shielding portions 31B of FIG. 2A are respectively inserted through the respective oblong recesses 43C. The first conductor 43A further includes a first restricting surface 43G that contacts the inner surface of the connector casing 40 of FIG. 2B for restricting movement of the first conductor 43A when inserted into the connector casing 40.

Figure 3C:
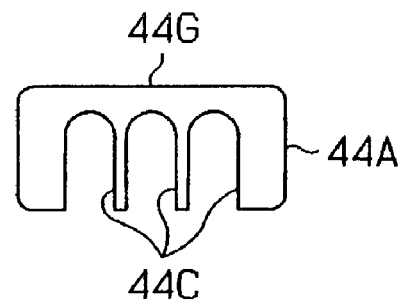
FIG. 3C is a schematic end view of a first fixing member according to the preferred embodiment of the present invention.
Figure 3B:
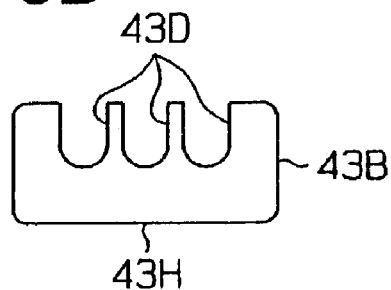
FIG. 3B is a schematic end view of a second conductor according to the preferred embodiment of the present invention.

Now referring to FIG. 3B, a diagram illustrates a schematic end view of the second conductor 43B according to the preferred embodiment of the present invention. The second conductor 43B is substantially rectangular in shape and includes three substantially oblong recesses or second inserting openings 43D that extend in thickness through the second conductor 43B. The bottom end of the oblong recess 43D is substantially circular arc in shape. The exposed portion of the electromagnetic shielding portions 31B of FIG. 2A are respectively inserted through the respective oblong recesses 43D. The second conductor 43B further includes a second restricting surface 43H that contacts the inner surface of the connector casing 40 of FIG. 2B for restricting movement of the second conductor 43B when inserted into the connector casing 40. The shapes of the first and second conductors 43A, 43B are identical to each other except the oblong recesses 43C, 43D.

Figure 3D:
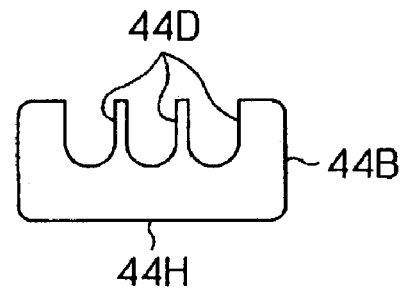
FIG. 3D is a schematic end view of a second fixing member according to the preferred embodiment of the present invention.
Figure 3E:
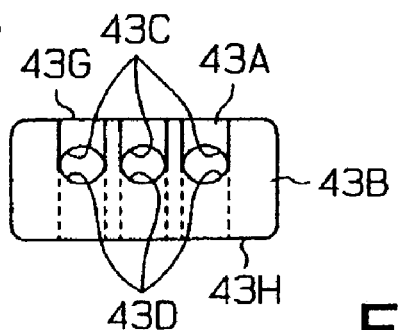
FIG. 3E is a schematic end view of the layered first and second conductors according to the preferred embodiment of the present invention.

Now referring to FIG. 3E, a diagram illustrates a schematic end view of the layered first and second conductors 43A, 43B according to the preferred embodiment of the present invention. The first and second conductors 43A, 43B are alternately layered in such a manner that the bottom ends of the oblong recesses 43C, 43D sandwich the exposed portions of the electromagnetic shielding portion 31B of FIG. 2A. In other words, the bottom ends of the oblong recesses 43C, 43D alternately contact the electromagnetic shielding portions 31B at each side of the first and second restricting surfaces 43G, 43H in a longitudinal direction of the cable 31 so as to hold the electromagnetic shielding portions 31B.

Referring back to FIG. 2B, in a manufacturing process of the connector 32, the first and second conductors 43A, 43B are press-fitted into the connector casing 40 through the insertion opening 40E in a state where the oblong recesses 43C, 43D sandwich the exposed portions of the electromagnetic shielding portions 31B. In the meantime, the first and second restricting surfaces 43G, 43H are pressed against the inner surface of the connector casing 40 so that the bottom ends of the oblong recesses 43C, 43D hold the electromagnetic shielding portions 31B. The electromagnetic shielding portions 31B are pressed and slightly deformed. Since the first and second restricting surfaces 43G, 43H are appropriately pressed against the connector casing 40, and since the oblong recesses 43C, 43D appropriately hold the electromagnetic shielding portions 31B, the electromagnetic shielding portions 31B are sufficiently conducted with the connector casing 40.

The cable 31 includes an outer layer 31F on the side near the inverter circuit E than the exposed portion of the electromagnetic shielding portion 31B. The outer layer 31F includes the insulating layer 31C on its outer circumference. One end of the outer layer 31F adjacent to the exposed portion is fixed to the connector casing 40 by a fixing member 44. Namely, the fixing member 44 fixes the cable 31 to the connector casing 40. The fixing member 44 includes a first fixing member 44A and a second fixing member 44B, which are alternately layered. In the preferred embodiment, the fixing member 44 includes the single first fixing member 44A and the two second fixing members 44B. The first and second fixing members 44A, 44B each are made of metal plate.

Now referring to FIG. 3C, a diagram illustrates a schematic end view of the first fixing member 44A according to the preferred embodiment of the present invention. The first fixing member 44A is substantially rectangular in shape as well as the first conductor 43A of FIG. 3A and includes three substantially oblong recesses or first inserting openings 44C that extend in thickness through the first fixing member 44A. The bottom end of the oblong recess 44C is substantially circular arc in shape. Each end of the outer layers 31F of FIG. 2A is respectively inserted through the respective oblong recesses 44C. The first fixing member 44A further includes a first restricting surface 44G that contacts the inner surface of the connector casing 40 of FIG. 2B for restricting movement of the first fixing member 44A when inserted into the connector casing 40.

Now referring to FIG. 3D, a diagram illustrates a schematic end view of the second fixing member 44B according to the preferred embodiment of the present invention. The second fixing member 44B is substantially rectangular in shape and includes three substantially oblong recesses or second inserting openings 44D that extend in thickness through the second fixing member 44B. The bottom end of the oblong recess 44D is substantially circular arc in shape. Each end of the outer layers 31F of FIG. 2A is respectively inserted through the respective oblong recesses 44D. The second fixing member 44B further includes a second restricting surface 44H that contacts the inner surface of the connector casing 40 of FIG. 2B for restricting movement of the second fixing member 44B when inserted into the connector casing 40.

Referring back to FIG. 2B, the first and second fixing members 44A, 44B are alternately layered in such a manner that the bottom ends of the oblong recesses 44C, 44D sandwich one ends of the outer layers 31F in the connector casing 40. In other words, the bottom ends of the oblong recesses 44C, 44D alternately contact the outer layers 31F at each side of the first and second restricting surfaces 44G, 44H in a longitudinal direction of the cable 31.

In a manufacturing process of the connector 32, the first and second fixing members 44A, 44B are press-fitted into the connector casing 40 through the insertion opening 40E of the connector casing 40 in a state where the oblong recesses 44C, 44D sandwich the ends of the outer layers 31F. In the meantime, the first and second restricting surfaces 44G, 44H are pressed against the inner surface of the connector casing 40 so that the bottom ends of the oblong recesses 44C, 44D hold the outer layers 31F. The cables 31 are pressed and slightly deformed. Since the first and second restricting surfaces 44G, 44H are appropriately pressed against the connector casing 40, and since the oblong recesses 44C, 44D appropriately hold the outer layers 31F, the outer layers 31F are sufficiently fixed to the connector casing 40. In the preferred embodiment, the fixing member 44 is in contact with the shield conductor 43. In other words, the first conductor 43A adjacent to the fixing member 44 and the second fixing member 44B adjacent to the shield conductor 43 are layered with each other.

A dust-proof rubber member or a blocking member 45 is fitted into the connector casing 40 in the vicinity of the shield conductor 43 near the fastener 31D. The dust-proof rubber member 45 prevents foreign substances from being involved from the shield conductor side to the fastener side through a gap between the cables 31 and the inner surface of the connector casing 40.

A rubber member or a waterproof seal member 46 is fitted into the connector casing 40 near the insertion opening 40E. The rubber member 46 prevents water from being involved into the connector casing 40 near the fixing member 44 through a gap between the cables 31 and the inner surface of the connector casing 40. In the preferred embodiment, the inner space of the insertion opening 40E for fitting the rubber member 46 has a larger dimension than the first and second conductors 43A, 43B, the first and second fixing members 44A, 44B so that the inner surface of the connector casing 40 for fitting the rubber member 46 is substantially not damaged while the first and second conductors 43A, 43B, the first and second fixing members 44A, 44B are being press-fitted into the connector casing 40. As a result, the rubber member 46 efficiently prevents water from being involved into the connector casing 40.

Figure 3F:
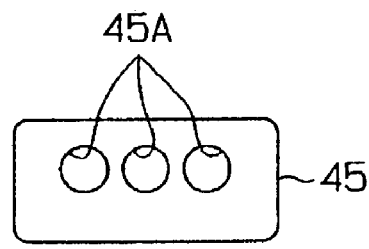
FIG. 3F is a schematic end view of a dust-proof rubber member according to the preferred embodiment of the present invention.

Now referring to FIG. 3F, a diagram illustrates a schematic end view of the dust-proof rubber member 45 according to the preferred embodiment of the present invention. The dust-proof rubber member 45 is substantially rectangular in shape as seen from the left side and the right side of FIG. 2B. The dust-proof rubber member 45 includes three through holes 45A for respectively inserting the cables 31 adjacent to the exposed portions of the electromagnetic shielding portions 31B on the fastener side, as described in FIG. 2B.

Figure 3G:
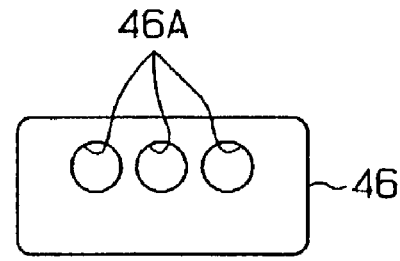
FIG. 3G is a schematic end view of a rubber member according to the preferred embodiment of the present invention.

Now referring to FIG. 3G, a diagram illustrates a schematic end view of the rubber member 46 according to the preferred embodiment of the present invention. The rubber member 46 is substantially rectangular in shape as seen from the left side and the right side of FIG. 2B. The rubber member 46 includes three through holes 46A for respectively inserting the outer layers 31F of the cables 31.

According to the preferred embodiment, the following advantageous effects are obtained.

(1) The connector 32 is integrally connected to the inverter circuit E through the cables 31 while the connector 32 is detachably connected to the terminals 34 on the motor compressor C. For example, in comparison to a structure including relay connectors, one of which is integrally connected to an electric motor through a cable, the other is integrally connected to an inverter circuit through a cable, the number of components for connecting the motor compressor C to the inverter circuit E is reduced in the preferred embodiment. As a result, costs for the components and for assembling are reduced. In addition, electrical resistance between the motor compressor C and the inverter circuit E are reduced as a whole so that the effect of electromagnetic shielding is effectively obtained.

(2) For example, in comparison to a structure that a motor compressor and an inverter circuit are directly connected to each other through a cable without any relay connectors therebetween, the motor compressor C and the inverter circuit E are separately assembled in a process of manufacturing a compressor unit in the preferred embodiment.

(3) The connector casing 40 is made of metal. For example, in comparison to a connector casing made of resin, the mechanical strength of the connector casing 40 is improved, and the effect of electromagnetic shielding improves in the preferred embodiment.

(4) The connector 32 includes the shield conductor 43 for conducting the connector casing 40 with the electromagnetic shielding portions 31B of the cables 31. Additionally, the metal connector casing 40 is fixedly connected to the metal housing 11 so as to directly contact the housing 11 so that the electromagnetic shielding portion 31B is grounded through the housing 11. Since the ground is permitted by fitting the connector 32 to the housing 11, a grounding process in the preferred embodiment is easier than that with an extra ground lead wire that conducts a connector with a housing. Additionally, since a contact area between the connector 32 and the housing 11 is allowed to expand in the preferred embodiment in comparison to the above-mentioned structure with the ground lead wire, electrical resistance between the connector 32 and the housing 11 is easily reduced. As a result, the effect of electromagnetic shielding is effectively obtained. Incidentally, since the flange 40C of the connector 32 is fastened to the housing 11 by the bolt 33, the flange 40C tightly adheres to the metal housing 11. Consequently, the housing 11 is reliably conducted with the connector casing 40. Accordingly, electrical resistance between the housing 11 and the connector casing 40 is reduced so that the effect of electromagnetic shielding is effectively obtained.

(5) The shield conductor 43 is made of metal. When the shield conductor 43 is press-fitted into the connector casing 40, pressing force is generated between the shield conductor 43 and the electromagnetic shielding portion 31B, and between the shield conductor 43 and the connector casing 40. Meanwhile, the electromagnetic shielding portion 31B is pressed and deformed by the respective oblong recesses 43C, 43D. Due to the pressing force, the electromagnetic shielding portion 31B is reliably conducted with the connector casing 40. Accordingly, electrical resistance between the electromagnetic shielding portion 31B and the connector casing 40 is reduced so that the effect of electromagnetic shielding is effectively obtained.

(6) The dust-proof rubber member 45 is provided between the shield conductor 43 and the fastener 31D in the connector casing 40 for preventing dust from being involved from the shield conductor side into the fastener side. Accordingly, for example, when the shield conductor 43 is press-fitted into the connector casing 40, metal particles produced due to sliding between the connector casing 40 and the shield conductor 43 is prevented from being involved into the fastener side.

(7) The fixing member 44 is fixed to the connector casing 40 by press-fitting the fixing member 44 into the connector casing 40. For example, in comparison to a structure that a cable is fixed to a connector casing by caulking, assembling is easy in the preferred embodiment. In addition, the cable 31 is pressed and deformed due to the oblong recesses 44C, 44D so that the cable 31 is firmly fixed to the connector casing 40.

(8) The rubber member 46 is provided at the insertion opening 40E of the connector casing 40 and prevents water from being involved into the connector casing 40, or the fixing member side, through the insertion opening 40E.

(9) The O-ring 41 is provided at the fitting portion 40A of the connector casing 40 in the communication bore 11D of the housing 11 and prevents water from being involved into the housing 11 and the connector casing 40 through a gap between the housing 11 and the connector casing 40.

The present invention is not limited to the preferred embodiment described above but may be modified into the following alternative embodiments.

In alternative embodiments to the above preferred embodiment, a connector is integrally connected to a motor compressor, and the connector is detachably connected to a terminal on an inverter circuit.

In alternative embodiments to the above preferred embodiment, the connector 32 is not limited to be fastened to the housing 11 by the bolt 33. If the connector 32 does not fall off from the housing 11, and if the connector side and the housing side are sufficiently conducted with each other to ensure the effect of electromagnetic shielding, the connector 32 and the housing 11 need not to be fastened by the bolt 33.

In alternative embodiments to the above preferred embodiment, the O-ring 41 for sealing a gap between the fitting portion 40A of the connector 32 and the inner circumferential surface of the communication bore 11D is omitted.

In alternative embodiments to the above preferred embodiment, the rubber member 46 is omitted.

In alternative embodiments to the above preferred embodiment, the number of the first and second fixing members 44A, 44B is one or above.

Figure 4A:
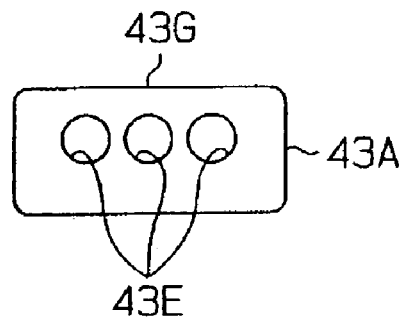
FIG. 4A is a schematic end view of a first conductor according to an alternative embodiment of the present invention.

In alternative embodiments to the above preferred embodiment, referring to FIG. 4A, a diagram illustrates a schematic end view of a first conductor 43A according to the alternative embodiment of the present invention. The first conductor 43A is substantially rectangular in shape and includes three substantially circular holes or first inserting openings 43E that extend in thickness through the first conductor 43A. The exposed portion of the electromagnetic shielding portions 31B of FIG. 2A are respectively inserted through the respective circular holes 43E. The first conductor 43A further includes a first restricting surface 43G that contacts the inner surface of the connector casing 40 of FIG. 2B when inserted into the connector casing 40.

Figure 4C:
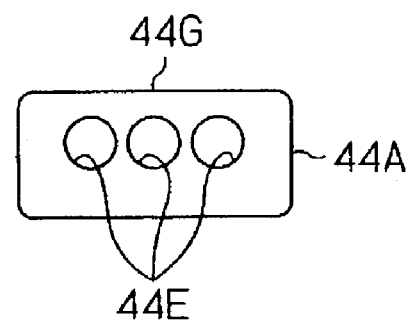
FIG. 4C is a schematic end view of a first fixing member according to the alternative embodiment of the present invention.
Figure 4B:
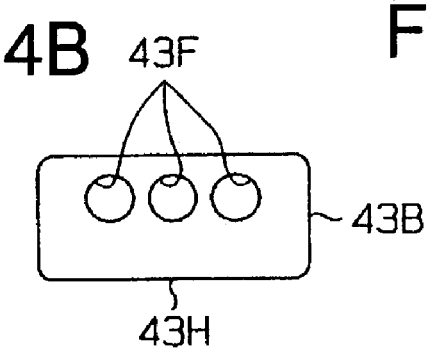
FIG. 4B is a schematic end view of a second conductor according to the alternative embodiment of the present invention.

Now referring to FIG. 4B, a diagram illustrates a schematic end view of a second conductor 43B according to the alternative embodiment of the present invention. The second conductor 43B is substantially rectangular in shape and includes three substantially circular holes or second inserting openings 43F that extend in thickness through the second conductor 43B. The exposed portion of the electromagnetic shielding portions 31B of FIG. 2A are respectively inserted through the respective circular holes 43F. The second conductor 43B further includes a second restricting surface 43H that contacts the inner surface of the connector casing 40 of FIG. 2B when inserted into the connector casing 40. The shape of the second conductors 43B is identical to the first conductor 43A of FIG. 4A except the circular holes 43E, 43F.

Figure 4D:
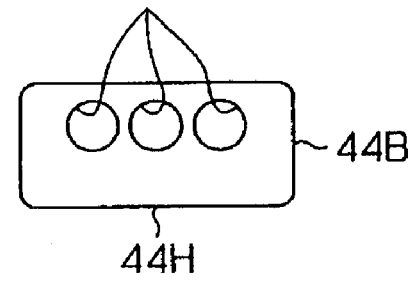
FIG. 4D is a schematic end view of a second fixing member according to the alternative embodiment of the present invention.
Figure 4E:
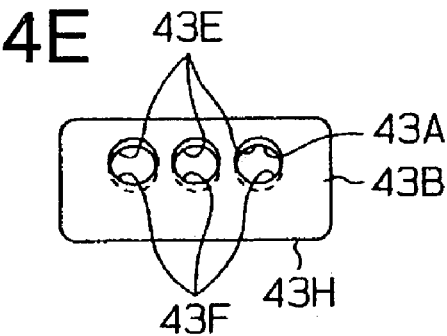
FIG. 4E is a schematic end view of the layered first and second conductors according to the alternative embodiment of the present invention.

Now referring to FIG. 4E, a diagram illustrates a schematic end view of the layered first and second conductors 43A, 43B according to the alternative embodiment of the present invention. The first and second conductors 43A, 43B are alternately layered in such a manner that the ends adjacent to the first and second restricting surfaces 43G, 43H sandwich the exposed portion of the electromagnetic shielding portions 31B of FIG. 2A. The electromagnetic shielding portion 31B is not shown in the drawing. In a process of manufacturing the connector 32, the first and second conductors 43A, 43B are press-fitted into the connector casing 40 in such a manner that the respective circular holes 43E, 43F sandwich the exposed portion of the electromagnetic shielding portion 31B. Due to the press-fit of the first and second conductors 43A, 43B, pressing force is generated on the inner circumferential surfaces of the circular holes 43E, 43F against the electromagnetic shielding portion 31B. Then the electromagnetic shielding portion 31B is pressed and deformed. Incidentally, the shapes of the inserting openings 43E, 43F formed in the respective first and second conductors 43A, 43B are not limited to a circular shape.

In alternative embodiments to the above preferred embodiment, referring to FIG. 4C, a diagram illustrates a schematic end view of a first fixing member 44A according to the alternative embodiment of the present invention. The first fixing member 44A is substantially rectangular in shape as well as the first conductor 43A of FIG. 4A and includes three substantially circular holes or first inserting openings 44E that extend in thickness through the first fixing member 44A. Each end of the outer layers 31F of FIG. 2A is respectively inserted through the respective circular holes 44E. The first fixing member 44A further includes a first restricting surface 44G that contacts the inner surface of the connector casing 40 of FIG. 2B when inserted into the connector casing 40.

Now referring to FIG. 4D, a diagram illustrates a schematic end view of the second fixing member 44B according to the alternative embodiment of the present invention. The second fixing member 44B is substantially rectangular in shape and includes three substantially circular holes or second inserting openings 44F that extend in thickness through the second fixing member 44B. Each end of the outer layers 31F of FIG. 2A is respectively inserted through the respective circular holes 44F. The second fixing member 44B further includes a second restricting surface 44H that contacts the inner surface of the connector casing 40 of FIG. 2B when inserted into the connector casing 40.

Figure 4F:
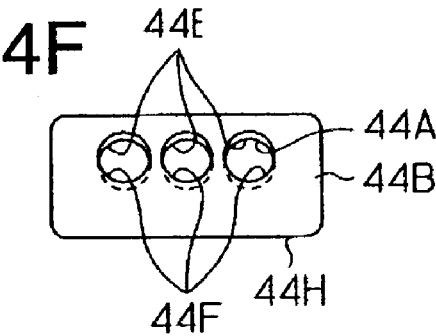
FIG. 4F is a schematic end view of the layered first and second fixing members according to the alternative embodiment of the present invention.
Figure 5:
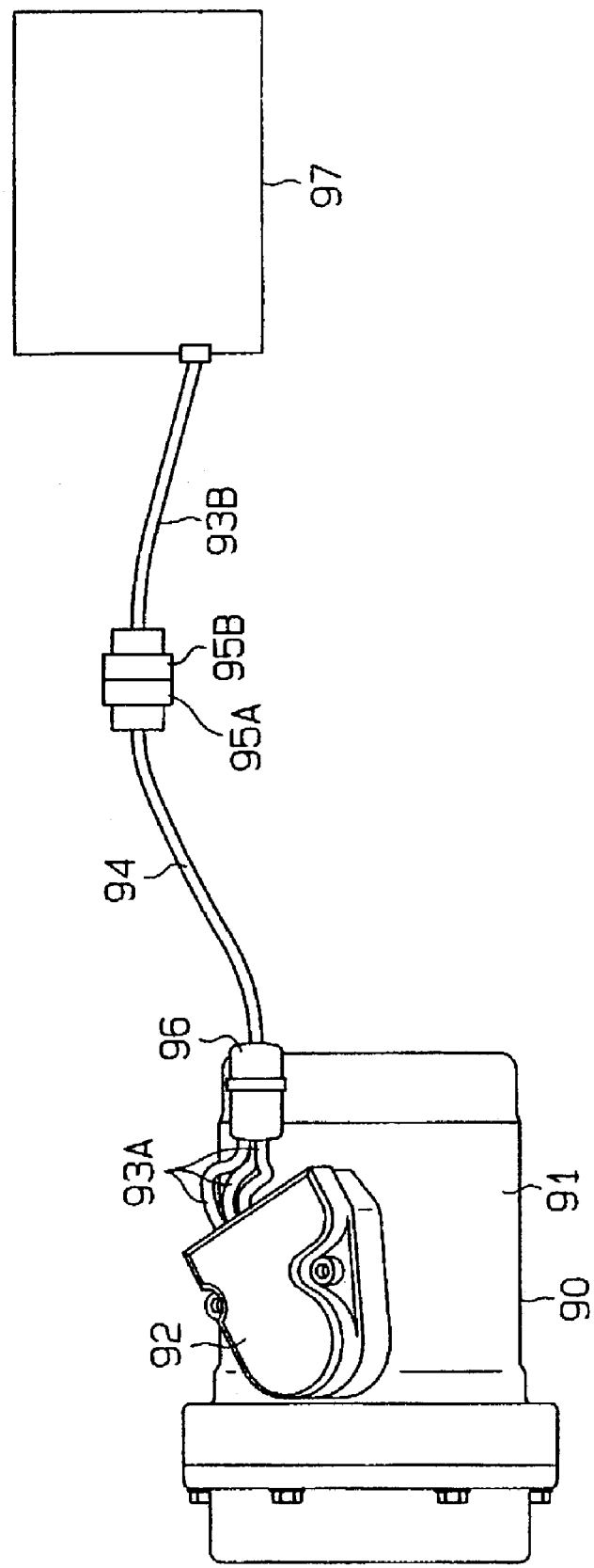
FIG. 5 is a schematic view of a compressor unit according to a prior art.

Now referring to FIG. 4F, a diagram illustrates a schematic end view of the layered first and second fixing members 44A, 44B according to the alternative embodiment of the present invention. The first and second fixing members 44A, 44B are alternately layered in such a manner that the ends adjacent to first and second restricting surfaces 44G, 44H sandwich the outer layers 31F of FIG. 2A. The outer layer 31F is not shown in the drawing. In a process of manufacturing the connector 32, the first and second fixing members 44A, 44B are press-fitted into the connector casing 40 in such a manner that the respective circular holes 44E, 44F sandwich the outer layer 31F. Due to the press-fit of the first and second fixing members 44A, 44B, pressing force is generated on the inner circumferential surfaces of the circular holes 44E, 44F against the cable 31. Then the cable 31 is pressed and deformed. Incidentally, the shapes of the inserting openings 44E, 44F formed in the respective first and second fixing members 44A, 44B are not limited to a circular shape.

In alternative embodiments to the above preferred embodiment, the cable 31 is held due to the inserting openings 44C, 44D, 44E, 44F of the first and second fixing members 44A, 44B due to pressing force from the respective restricting surfaces 44G, 44H but is not deformed.

In alternative embodiments to the above preferred embodiment, first and second fixing members do not include respective first and second inserting openings, and the first and second fixing members made of substantially rectangular plate sandwich the outer layer 31F.

In alternative embodiments to the above preferred embodiment, the first and second fixing members 44A, 44B for fixing the cable 31 are not limited to be alternately layered. Namely, first and second fixing members are overlapped in thickness, that is, a longitudinal direction of the cable 31, and the first and second fixing members sandwich the cable 31.

In alternative embodiments to the above preferred embodiment, the first and second fixing members 44A, 44B are not limited to be made of plate. For example, first and second fixing members are made of block type member.

In alternative embodiments to the above preferred embodiment, the cable fixing member 44 is not limited to include the first and second fixing members 44A, 44B. For example, a cable fixing member is constituted of one type of fixing member, and the fixing member and the connector casing fixedly sandwich the cable 31. Additionally, a cable fixing member includes three types or above fixing members.

In alternative embodiments to the above preferred embodiment, the cable fixing member 44 is not limited to be made of metal. For example, a cable fixing member is made of resin.

In alternative embodiments to the above preferred embodiment, the structure for fixing the cable 31 to the connector casing 40 is not limited to press-fitting. For example, the cable 31 is fastened to the connector casing 40 by a bolt with a fastener, or the cable 31 is fixed to the connector casing 40 by caulking a member on the connector casing side.

In alternative embodiments to the above preferred embodiment, the structure for fixing the cable 31 to the connector casing 40 does not include the fixing member 44. For example, the cable 31 is fixed to the connector casing 40 by fixing the resin casing 42 to the connector casing 40.

In alternative embodiments to the above preferred embodiment, the dust-proof rubber member 45 is not limited to only prevent dust. For example, a dust-proof rubber member also waterproofs.

In alternative embodiments to the above preferred embodiment, the connector 32 does not include the dust-proof rubber member 45.

In alternative embodiments to the above preferred embodiment, the number of the first and second conductors 43A, 43B is respectively one or above.

In alternative embodiments to the above preferred embodiment, the electromagnetic shielding portion 31B is held due to the oblong recesses 43C, 43D, the circular holes 43E, 43F of the first and second conductors 43A, 43B but is not deformed.

In alternative embodiments to the above preferred embodiment, first and second conductors do not include the first and second inserting openings. For example, the first and second conductors made of substantially rectangular plate sandwich the exposed portion of the electromagnetic shielding portion 31B.

In alternative embodiments to the above preferred embodiment, the first and second conductors 43A, 43B are not limited to be alternately layered. Namely, first and second conductors are overlapped in thickness, that is, a longitudinal direction of the cable 31, and sandwich the electromagnetic shielding portion 31B.

In alternative embodiments to the above preferred embodiment, the first and second conductors 43A, 43B are not limited to be made of plate. For example, first and second conductors are made of block type member.

In alternative embodiments to the above preferred embodiment, the shield conductor 43 is not limited to include the first and second conductors 43A, 43B. For example, a shield conductor is constituted of one type of conductor, and the conductor and the connector casing fixedly sandwich the electromagnetic shielding portion 31B. Additionally, a shield conductor includes three types or above conductors.

In alternative embodiments to the above preferred embodiment, the structure for connecting the electromagnetic shielding portion 31B to the connector casing 40 is not limited to press-fitting. For example, the electromagnetic shielding portion 31B is fastened to the connector casing 40 by a bolt with a fastener, or the electromagnetic shielding portion 31B is fixed to the connector casing 40 by caulking a metal portion on the connector casing side. In addition, the electromagnetic shielding portion 31B is fixed to the connector casing 40 by soldering.

In alternative embodiments to the above preferred embodiment, when the electromagnetic shielding portion 31B need not to be grounded through the shield conductor 43, the connector casing 40 and the housing 11 of the motor compressor C, the shield conductor 43, the connector casing 40 and the housing 11 are not limited to be made of electrically conductive metal.

In alternative embodiments to the above preferred embodiment, a cable without an electromagnetic shielding portion is employed instead of the cable 31 with the electromagnetic shielding portion 31B. In this state, a shield conductor for conducting the electromagnetic shielding portion with the connector casing need not to be provided.

In alternative embodiments to the above preferred embodiment, the electrical circuit device 97 is not limited to the inverter circuit E for supplying electric current to the electric motor 13. Any components that electrically connect with a compressor is applicable to the electrical circuit device 97.

In alternative embodiments to the above preferred embodiment, the compressor main body 90 is not limited to a motor compressor C that internally includes an electric motor 13. For example, a compressor that is driven by an engine for driving a vehicle is also applicable to the compressor main body 90.

In alternative embodiments to the above preferred embodiment, the compression mechanism 12 is not limited to a scroll type. For example, a piston type, a vane type and a helical type are also applicable to the compression mechanism 12.

In alternative embodiments to the above preferred embodiment, the present invention is not limited to a compressor used for a refrigeration cycle. For example, the present invention is also employed to an air compressor used for an air suspension device of a vehicle and the like.

Therefore, the present examples and embodiments are to be considered as illustrative and not restrictive, and the invention is not to be limited to the details given herein but may be modified within the scope of the appended claims.

What is claimed is:

1. A compressor unit comprising:
 a compressor main body;
 an electrical circuit device electrically connected to the compressor main body through a cable, the compressor main body or the electrical circuit device integrally being connected to the cable at one end of the cable; and
 a connector provided at the other end of the cable for being connected to a terminal and including a cable fixing member for fixing the cable to a casing of the connector, the cable fixing member including first and second fixing members that respectively have first and second restricting surfaces, the first and second fixing members being alternately positioned on two sides along a longitudinal direction of the cable while the first and second fixing members are press-fitted into the casing in such a manner that the first and second restricting surfaces are pressed against an inner surface of the casing, the first and second fixing members having first and second inserting openings in an opposing direction for inserting the cable, the cable being engaged by inner circumferential surfaces of the first and second inserting openings due to pressing force generated at the first and second restricting surfaces in such a manner that the inner circumferential surfaces of the first and second inserting openings presses the cable in the opposing direction.

2. The compressor unit according to claim 1, wherein the connector has a casing made of metal.

3. The compressor unit according to claim 2, wherein compressor main body or the electrical circuit device has the terminal and includes a housing made of metal, the cable having an electromagnetic shielding portion around its lead wire, the connector having a shield conductor for conducting the casing with the electromagnetic shielding portion, the casing at least partially contacting the housing.

4. The compressor unit according to claim 3, wherein the shield conductor has first and second conductors each made of metal plate, the first and second conductors respectively having first and second restricting surfaces for restricting movement of the first and second conductors, the first and second conductors being layered while the first and second conductors are press-fitted into the casing in such a manner that the first and second restricting surfaces are pressed against an inner surface of the casing, the first and second conductors respectively having first and second inserting openings for inserting the electromagnetic shielding portion, the electromagnetic shielding portion being held by inner circumferential surfaces of the first and second inserting openings due to pressing force generated at the first and second restricting surfaces in such a manner that the inner circumferential surfaces of the first and second inserting openings respectively contact the electromagnetic shielding portion.

5. The compressor unit according to claim 4, wherein the first and second conductors are alternately layered.

6. The compressor unit according to claim 4, wherein the shapes of the first and second inserting openings are selected from the group consisting of oblong recess and circular hole.

7. The compressor unit according to claim 4, wherein the electromagnetic shielding portion is pressed by the inner circumferential surfaces of the first and second inserting openings due to pressing force generated at the first and second restricting surfaces so as to be deformed.

8. The compressor unit according to claim 3, wherein the connector includes:
   a terminal connecting portion accommodated in the casing for connecting with the terminal, the terminal connecting portion being conducted with the lead wire of the cable; and
   a blocking member located between the shield conductor and the terminal connecting portion in the casing for blocking foreign substances.

9. The compressor unit according to claim 8, wherein the blocking member is a dust-proof rubber.

10. The compressor unit according to claim 1, wherein the first and second fixing members are alternately layered.

11. The compressor unit according to claim 1, wherein the shapes of the first and second inserting openings are selected from the group consisting of oblong recess and circular hole.

12. The compressor unit according to claim 1, wherein the cable is pressed by the inner circumferential surfaces of the first and second inserting openings due to pressing force generated at the first and second restricting surfaces so as to be deformed.

13. The compressor unit according to claim 1, wherein the connector includes an insertion opening that is formed in a casing of the connector for inserting the cable into the casing, the compressor unit further comprising:
   a seal member located at the opening.

14. The compressor unit according to claim 13, wherein the seal member waterproofs.

15. The compressor unit according to claim 1, further comprising:
   a seal member located between a casing of the connector and a housing of one of the compressor main body and the electrical circuit device having the terminal.

16. The compressor unit according to claim 15, wherein the seal member is an O-ring.

17. The compressor unit according to claim 15, wherein the seal member waterproofs.

18. The compressor unit according to claim 1, wherein the connector is integrally connected to the electrical circuit device through the cable, the compressor main body including the terminal, the connector being detachably connected to the terminal.

19. The compressor unit according to claim 1, wherein the compressor main body includes a scroll type compression mechanism.

20. The compressor unit according to claim 1, wherein the compressor main body includes an electric motor.

21. The compressor unit according to claim 1, wherein the electrical circuit device is an inverter circuit.

22. The compressor unit according to claim 1, wherein the connector is detachably connected to the terminal.

23. A connector for a cable connecting a compressor and an electrical circuit, the cable having a lead wire, an electromagnetic shielding portion and an insulating layer, the connector comprising:
   a casing;
   a conductor located in said casing for contacting the electromagnetic shielding portion of the cable, said conductor including first and second conductors that respectively have first and second contacting openings, the first and second conductors being alternately positioned on two sides along a longitudinal direction of the cable for sandwiching the electromagnetic shielding portion of the cable by the first and second contacting openings; and
   a cable fixing member located in said casing for fixedly placing the cable at a predetermined position within said casing, the cable fixing member including first and second fixing members that respectively have first and second inserting openings, the first and second fixing members being alternately positioned on two sides along a longitudinal direction of the cable for sandwiching the insulating layer of the cable by the first and second inserting openings.

24. The connector for a cable connecting a compressor and an electrical circuit according to claim 23 wherein the first and second members respectively have first and second restricting surfaces, the first and second fixing members being press-fitted into the casing in such a manner that the first and second restricting surfaces are pressed against an inner surface of the casing, the first and second inserting openings deforming the insulating layer in an opposing direction due to the press fit by the first and second restricting surfaces.

25. The connector for a cable connecting a compressor and an electrical circuit according to claim 23 wherein the first and second conductors respectively have first and second restricting surfaces for restricting movement of the first and second conductors, the first and second conductors are press-fitted into the casing in such a manner that the first and second restricting surfaces are pressed against an inner surface of the casing.

26. A connector for a cable connecting a compressor and an electrical circuit, the cable having a lead wire, an electromagnetic shielding portion and an insulating layer, the connector comprising:
   a casing;
   a conductor located in said casing for contacting the electromagnetic shielding portion of the cable; and
   a cable fixing member located near said conductor in said casing for fixedly placing the cable at a predetermined position within said casing, the cable fixing member including first and second fixing members that respectively have first and second inserting openings, the first and second fixing members being alternately positioned on two sides along a longitudinal direction of the cable for sandwiching the insulating layer of the cable by the first and second inserting openings.

27. The connector for a cable connecting a compressor and an electrical circuit according to claim 26 wherein the first and second members respectively have first and second restricting surfaces, the first and second fixing members being press-fitted into the casing in such a manner that the first and second restricting surfaces are pressed against an inner surface of the casing, the first and second inserting openings deforming the insulating layer in an opposing direction due to the press fit by the first and second restricting surfaces.

28. The connector for a cable connecting a compressor and an electrical circuit according to claim 26 wherein said conductor includes first and second conductors that respectively have first and second restricting surfaces for restricting movement of the first and second conductors, the first and second conductors being alternately positioned along the longitudinal direction of the cable while the first and second conductors are press-fitted into the casing in such a manner that the first and second restricting surfaces are pressed against an inner surface of the casing.

29. The connector for a cable connecting a compressor and an electrical circuit according to claim 28 wherein the first and second conductors respectively have first and second contacting openings for sandwiching the electromagnetic shielding portion of the cable by the first and second contacting openings.

* * * * *